Feb. 19, 1952

C. GERST 2,586,220

FLUID OPERATED CLUTCH

Filed March 27, 1948

INVENTOR.
CHRIS GERST
BY
ATT.

Feb. 19, 1952  C. GERST  2,586,220
FLUID OPERATED CLUTCH
Filed March 27, 1948  4 Sheets-Sheet 2

INVENTOR.
CHRIS GERST
BY
Gustav A. Wolff
ATT.

Feb. 19, 1952   C. GERST   2,586,220
FLUID OPERATED CLUTCH

Filed March 27, 1948   4 Sheets-Sheet 3

INVENTOR.
CHRIS GERST
BY
Gustav A. Wolff
ATT.

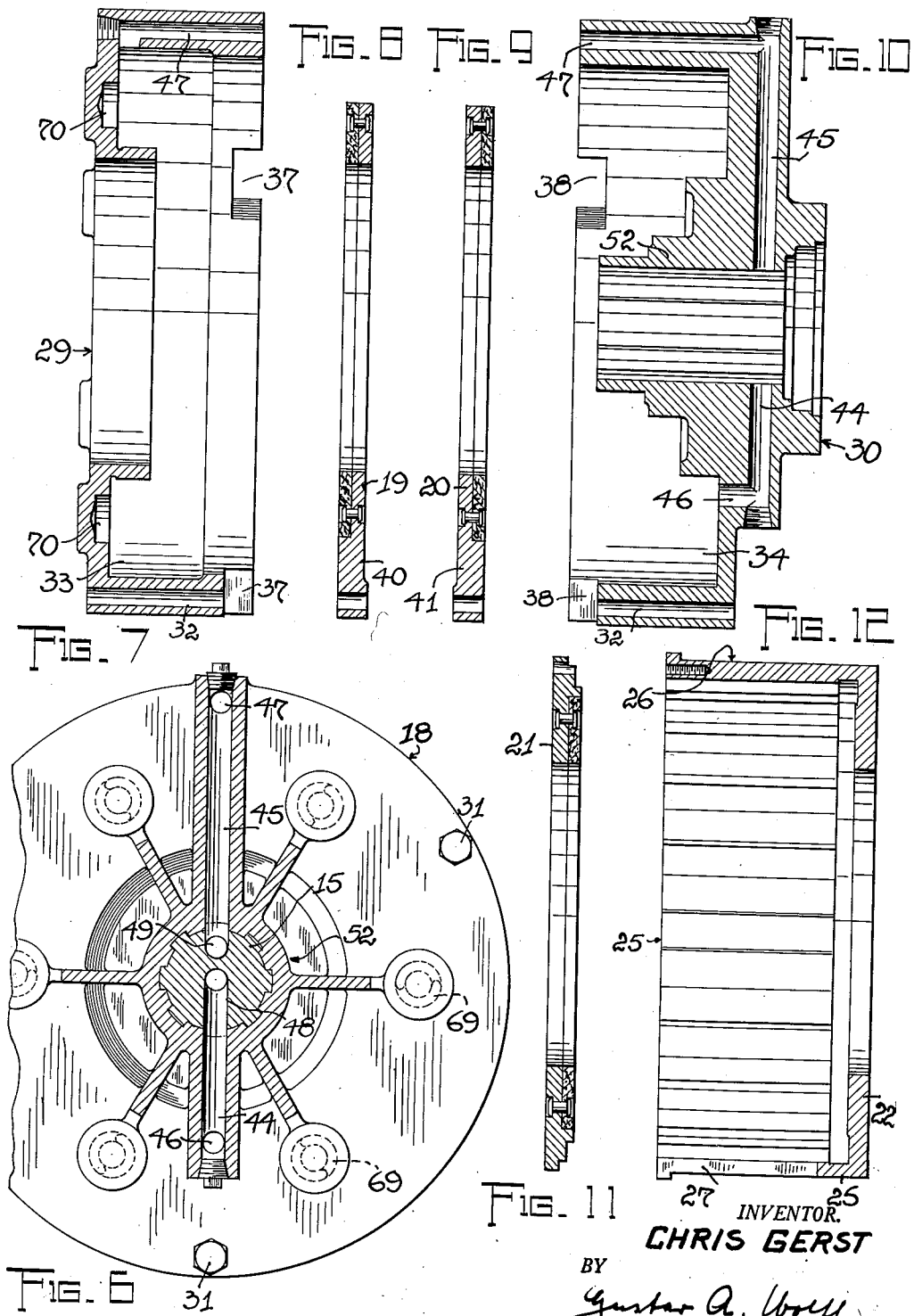

Patented Feb. 19, 1952

2,586,220

UNITED STATES PATENT OFFICE 2,586,220

FLUID OPERATED CLUTCH

Chris Gerst, Detroit, Mich., assignor to The Transmission & Gear Company, Dearborn, Mich., a corporation of Michigan Application March 27, 1948, Serial No. 17,491

8 Claims. (Cl. 192—87)

The present invention relates to friction clutches of the type in which independently rotatable driving and driven members are coupled with each other by friction disks forced into frictional contact by cooperating backing and clamping plate structures, and is particularly concerned with improvements in dual friction clutches of the type disclosed in my copending application for "Clutch Mechanism," Serial No. 784,681, filed November 7, 1947, now Patent No. 2,573,135, October 30, 1951. Dual friction clutches of this type include a pressure plate structure provided with axially spaced pressure plates, a backing plate structure positioned between the pressure plates, and clutch disk assemblies positioned between the pressure plates at opposite sides of the backing plate structure for selective actuation of these clutch disk assemblies by axial shifting of the pressure plate structure with respect to the backing plate structure in opposite directions.

The primary object of the present invention is the provision of a dual friction clutch of the type referred to above in which a pressure plate structure having axially spaced, cooperating pressure plates is axially shiftably interengaged with a backing plate structure so that backing plate means of said backing plate structure extend between the pressure plates of the pressure plate structure, in which clutch disk assemblies are extended between the pressure plates and the backing plate means and in which a housing member of the backing plate structure shiftably supports the pressure plate structure and, near its opposite ends, fluid-tightly engages the pressure plates of the pressure plate structure to permit selective shifting of the pressure plate structure in opposite directions by fluid under pressure selectively fed into the opposite ends of said housing.

Another object of the invention is the provision of a dual friction clutch of the type referred to above in which a pressure plate structure having axially spaced, cooperating pressure plates is axially shiftably supported by and interengaged with a backing plate structure so that backing plate means of said backing plate structure extend between the pressure plates of the pressure plate structure, in which clutch disk assemblies are extended between the pressure plates and the backing plate means, in which a housing member of the backing plate structure shiftably supports the pressure plate structure and, near its opposite ends, fluid-tightly engages the pressure plates to permit selective shifting of the pressure plate in opposite directions by fluid under pressure selectively fed into the opposite ends of said housing, and in which yielding means automatically shift the pressure plate structure into predetermined position when the clutch structure is inactivated by release of the pressure fluid.

The above and additional objects and novel features of construction, combination and relation of parts by which the objects in view have been attained will appear and are set forth in detail in the course of the following specification. The drawings accompanying and forming part of the specification illustrate a practical embodiment of the invention, but it will be apparent as the specification proceeds that the structure of the invention may be modified and changed in various ways without departure from the true spirit and scope of the invention.

In the drawings:

Fig. 3 is an enlarged longitudinal sectional view through the dual friction clutch shown in Fig. 1.

Fig. 6 is a cross-sectional view on line 6—6 of Fig. 3.

Figs. 7 through 12 show the pressure plate and backing plate structures of the dual friction clutch in disassembled condition, thus Fig. 7 is a sectional view through one of the two ring-shaped members forming the housing of the backing plate structure.

Figs. 8 and 9 are sectional views through the two ring-shaped backing plates of the backing plate structure; and Fig. 10 is a sectional view through the other one of the two ring-shaped members forming the housing of the backing plate structure.

Fig. 11 is a sectional view through the ring-shaped end plate of the housing of the pressure plate structure which end plate forms one pressure plate; and Fig. 12 is a sectional view through the ring-shaped body of the housing of the pressure plate structure, which body includes a vertical end wall portion forming the other pressure plate of the pressure plate structure.

Figure 1:
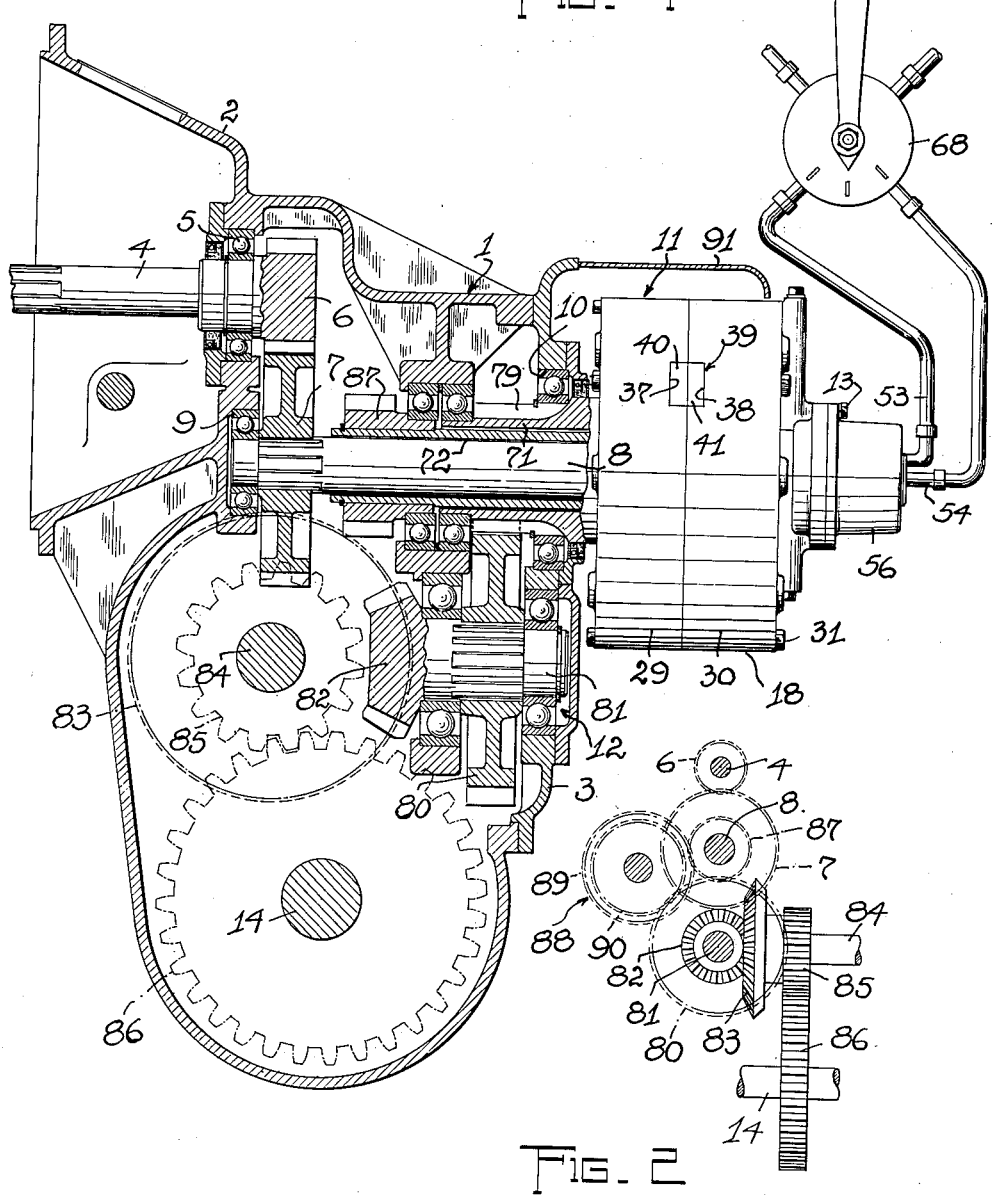
Fig. 1 is a longitudinal sectional view, partly in elevation through a reversible transmission embodying a dual friction clutch according to the invention for forward and reverse rotation of the output shaft of the transmission.
Figure 2:
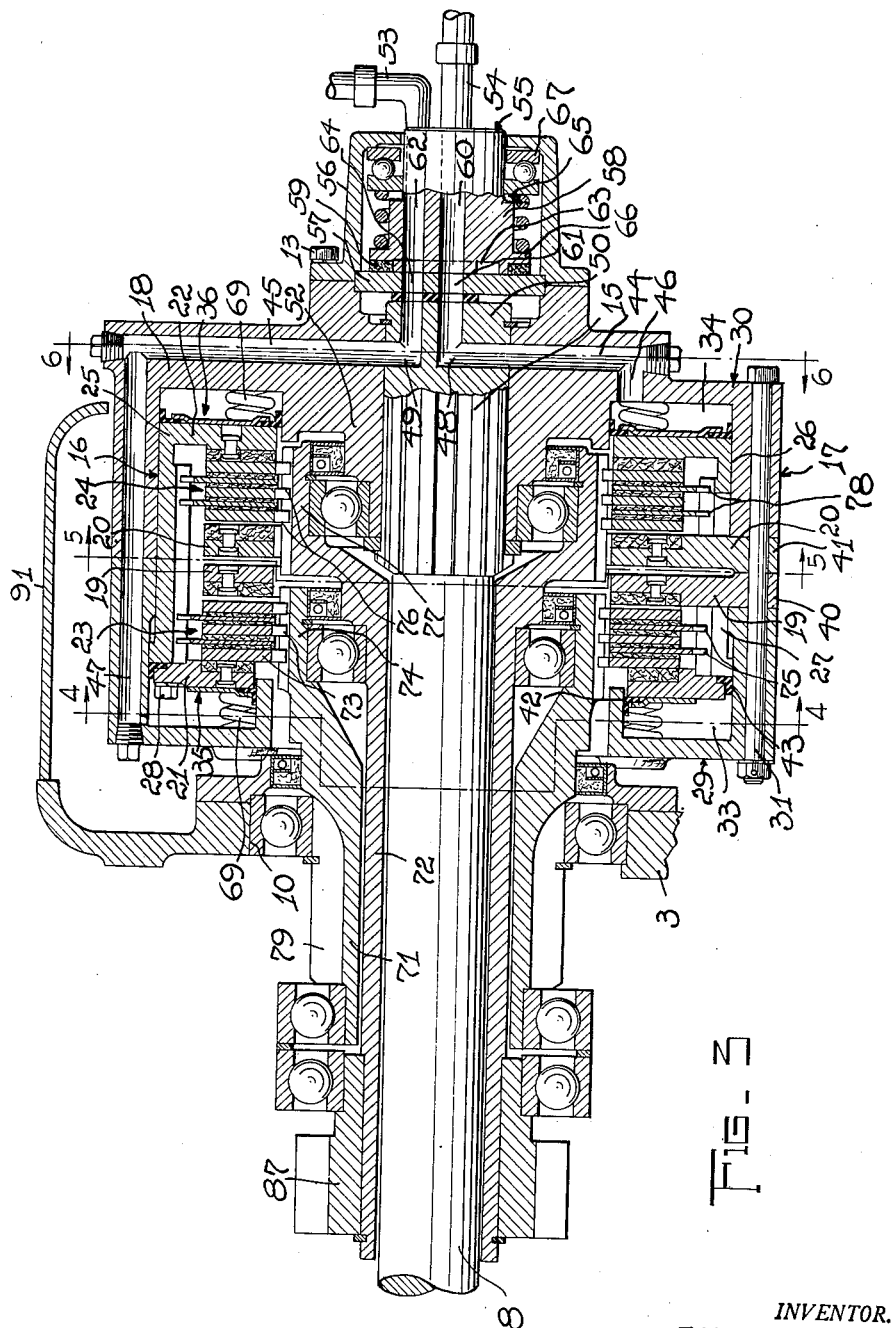
Fig. 2 is a diagrammatical view of the gearing of the transmission shown in Fig. 1.
Figure 4:
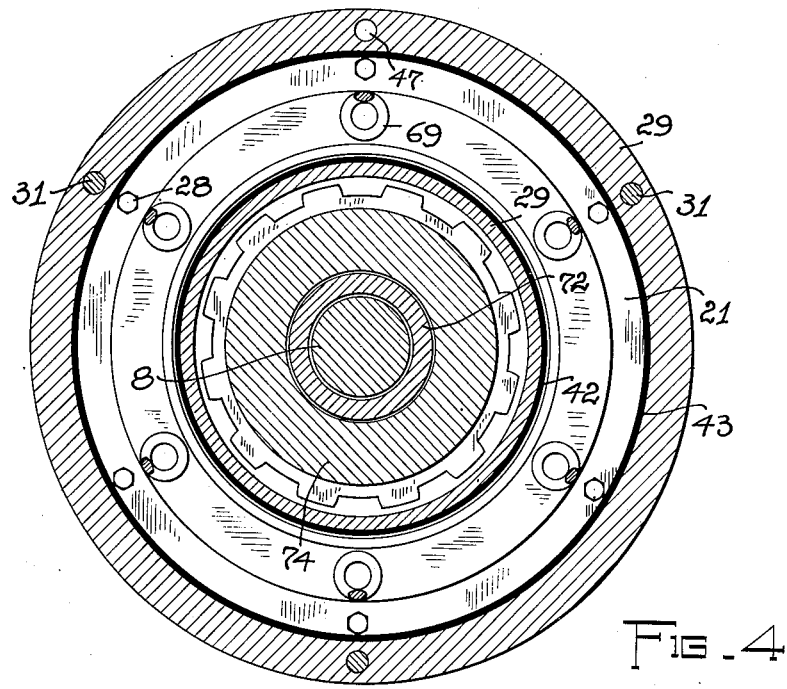
Fig. 4 is a cross-sectional view on line 4—4 of Fig. 3.
Figure 5:
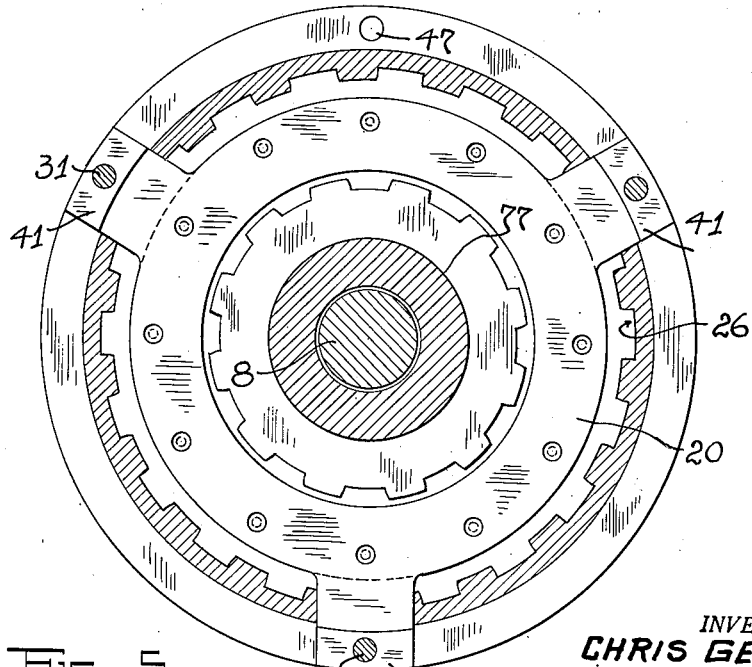
Fig. 5 is a cross-sectional view on line 5—5 of Fig. 3.

Referring now more particularly to the exemplified form of the transmission and clutch structure shown in the drawings, reference numeral 1 denotes a housing which at its rear end includes a bell housing 2 and at its front end is closed by a cover member 3, preferably of a shape as indicated. Housing 1 has extended thereinto through its bell housing 2 an input shaft 4 mounted in a ball bearing 5. The input shaft 4 mounts a spiral gear 6 meshing a larger spiral gear 7 on a countershaft 8 which is journaled in housing 1 by a ball bearing 9 and extended outside of housing 1 through an opening 10 in cover member 3. The countershaft 8 is selectively coupled by a dual friction clutch structure 11 and gearing 12 later to be described, with a main driven shaft 14 of the transmission.

Dual clutch structure 11 which is supported on the outwardly extended splined end portion 15 of countershaft 8 embodies a pressure plate structure 16 and a backing plate structure 17 slidably and non-rotatably coupled with each other for joint rotation with countershaft 8. These pressure plate and backing plate structures are non-rotatably and axially shiftably interengaged with each other in such a manner that pressure plate structure 16 is arranged fully within the housing 18 of backing plate structure 17 and the backing plates 19 and 20 of the backing plate structure extend into the pressure plate structure between its pressure plates 21 and 22 for selective actuation of two individual clutch disk assemblies 23 and 24 arranged within the pressure plate structure between its pressure plates and the backing plates of the backing plate structure.

The pressure plate structure 16 embodies a cylindrical body 25 having its peripheral wall 26 radially slotted so as to provide said body with a plurality of radial slots 27. Body 25 has its one end partly closed by a ring-shaped plate member which forms pressure plate 21 and is secured to said body by bolts 28 and, at its other end is provided with a ring-shaped inwardly extended flange which forms pressure plate 22 and is arranged opposite and parallel to pressure plate 21. The thus constructed pressure plate structure is slidably and non-rotatably engaged with backing plate structure 17, fully enclosed thereby, and has extended into the body 25 between pressure plates 21 and 22 the two backing plates 19 and 20 of the backing plate structure. The backing plate structure 17 has its housing 18 assembled from oppositely arranged, ring-shaped members 29 and 30 which are secured to each other by bolts 31 extended through bores 32 in said members. Each of the ring-shaped members 29 and 30 is formed with a circumferential inner channel 33, 34 respectively, which channels have U-shaped cross section and are dimensioned to slidably support the end portions 35, 36 of the pressure plate structure 16, and the outer peripheral walls of members 29 and 30 are radially slotted at 37 and 38 respectively to form housing 18 with radial openings 39 which are aligned with slots 27 in body 25 of pressure plate structure 16 and sized to rigidly secure the driving lugs 40 and 41 of ring-shaped backing plates 19 and 20 to housing 18 when its ring-shaped members are secured to each other.

The pressure plate structure, which is thus slidably and non-rotatably supported in the housing 18 of backing plate structure 17 is shifted in opposite directions to actuate either one of the two clutch disk assemblies 23 and 24, later to be described, by fluid under pressure selectively fed into the circumferential channels 33 and 34 of ring-shaped members 29 and 30, which fluid exerts pressure on the respective pressure plates 21 and 22 and effects shifting of the pressure plate structure in opposite directions. To facilitate such fluid operation of the dual clutch structure, pressure plate structure 16 carries at its opposite ends circular inner and outer sealing members 42 and 43 which fluid-tightly seal the opposite ends of body 25 of the pressure plate structure against the inner walls of the circumferential channels 33 and 34 of members 29 and 30. Fluid under pressure is fed from a source of supply, not shown, to circumferential channels 33 and 34 through bores 44 and 45, respectively, which bores communicate with these channels through lateral bores 46 and 47, respectively. The bores 44 and 45 directly communicate with L-shaped bores 48 and 49 in the splined portion 15 of a countershaft 8 which mounts backing plate structure 17 by engagement of its internally splined hub member 52 with the splined portion 15 of the countershaft. L-shaped passages 48 and 49 communicate by means of pipes 53 and 54 with the source of fluid under pressure, which pipes extend from a stationary passaged coupling member 55 yieldingly supported in a cup-shaped member 56 secured to hub member 52 by bolts 13. This coupling member which permits independent rotation of backing plate structure 17 and extension member 56 with respect to the stationary coupling member 55, cooperates with a ground steel plate 57 in fluid-tightly coupling the L-shaped passages 48 and 49 with pipes 53 and 54. Coupling member 55 embodies a cylindrical flanged body 58 having its flanged end provided with a graphite collar 59 contacting the steel plate 57. Body 58 includes a central passage 60 in communication with L-shaped passage 48 through a bore 61 in steel plate 57 to permit control of the reverse clutch disk assembly and another passage 62 in communication by means of a circular channel 63 and a bore 64 in steel plate 57 with L-shaped passage 49 to permit control of the forward clutch disk assembly. A compression spring 65 seated between the flange 66 of body 58 and ball bearing 67 yieldingly forces body 58 and its graphite collar 59 against the steel plate 57.

Clutch disk assembly 23 is actuated when selector valve 68 is set to feed fluid under pressure through pipe 53 to circular channel 33 and to discharge fluid from channel 34 through pipe 54 and selector valve 68 to the open atmosphere, and clutch disk assembly 24 is actuated when selector valve 68 is set to feed fluid under pressure through pipe 54 to circular channel 34 and to discharge fluid from channel 33 through pipe 53 and selector valve 68 to the open atmosphere. When selector valve 68 is set in its neutral position, both pipes 53 and 54 are in communication with the open atmosphere. When not activated the pressure plate structure 16 is yieldingly held in neutral position, in which both clutch disk assemblies are inactivated, by compression spring members 69 seated in recesses 70 of ring-shaped members 29 and 30 and abutting the opposite end portions 35 and 36 of pressure plate structure 16.

The clutch disk assemblies 23 and 24 effect selective coupling of countershaft 8 with two driven tubular shafts 71 and 72. Thus, clutch disk assembly 23 includes friction driven disks 73, non-rotatably and axially shiftably secured to the enlarged splined end portion 74 of the driven tubular shaft 71, arranged rotatably and concentrically with respect to countershaft 8, and friction driving disks 75, non-rotatably and axially shiftably secured to the internally toothed peripheral wall 26 of body 25, and clutch disk assembly 24 includes friction driven disks 76, non-rotatably and axially shiftably secured to the enlarged splined end portion 77 of driven tubular shaft 72 arranged rotatably between tubular shaft 71 and countershaft 8 in concentrical relation with respect thereto, and friction driving disks 78, non-rotatably and axially shiftably secured to the internally toothed peripheral wall 26 of body 25.

Tubular shaft 71, the forward drive shaft, is coupled by its gear section 79 coupled with gearing 12 to effect forward rotation of the main driven shaft 14. Thus gear section 79 of tubular shaft 71 meshes a large gear 80 on a countershaft 81 which mounts at its inner end a bevel gear pinion 82 meshing a large bevel gear 83 on a shaft 84 rectangularly related to countershaft 81 and the shaft 84 in turn mounts a spur gear 85 meshing a larger spur gear 86 on main driven shaft 14 to effect a large speed reduction of the rotary speed of input shaft 4 and main driven shaft 14.

Tubular shaft 72, the reverse drive shaft, is coupled by its pinion 87 and a double idler gear 88 with gearing 12 to effect reverse rotation of the main driven shaft 14. Thus pinion 87 meshes the gear portion 89 of double idler 88 which with its other gear portion 90 meshes the large gear 80 on countershaft 81 which gear then, through countershaft 81, bevel pinion 82, bevel gear 83, shaft 84 and spur gears 85 and 87, will effect reverse rotation of the main driven shaft 14 when tubular shaft 72 is driven by actuation of the clutch disk assembly 24. A hood-shaped cover member 91 secured to the cover member 3 protects the openly exposed dual friction clutch structure 11 and permits ready and easy access for adjustment and repair.

In describing the operation of the dual friction clutch structure it will be assumed that, as shown in Fig. 3, the pressure plate structure 16 is in neutral position and the countershaft 8 and hence all elements of the clutch structure except the friction driven disks 73 and 76 are rotating. If it is desired to drive main driven shaft 14 in a forward direction, selector valve 68 is shifted to its forward position to permit feeding of fluid under pressure from the source of supply to pipe 53 and hence through passage 62, channel 63, bore 64, L-shaped passage 49, bore 45 and bore 47 to channel 33 and effect shifting of the pressure plate structure 16 toward the right until clutch disk assembly 23 is actuated and couples the countershaft 8 with tubular shaft 71 effecting by its gear section 79 and gearing 12 forward rotation of main driven shaft 14. A reverse drive of the main driven shaft 14 is effected by shifting of selector valve 68 to its reverse position to permit feeding of fluid under pressure from the source of supply to pipe 54 and hence through passage 60, bore 61, L-shaped passage 48, bore 44 and bore 46 to channel 34 and effect shifting of the pressure plate structure toward the left until clutch disk assembly 24 is actuated and couples the countershaft 8 with tubular shaft 72 effecting by its pinion 87, double idler gear 88 and gearing 12 reverse rotation of main driven shaft 14.

Having thus described my invention, what I claim is:

1. In a dual clutch mechanism, a backing plate structure including a housing and backing plate means supported in the middle portion of said housing, a pressure plate structure including axially spaced, pressure plate means at the opposite ends of a housing non-rotatably and axially shiftably supported in the housing of said backing plate structure, said backing plate means extending into the housing of said pressure plate structure between its spaced pressure plate means, two indivdual friction disk assemblies arranged at opposite sides of said backing plate means and between the pressure plate means, cylinder means formed by the end portions of the housing of the backing plate structure, and piston means for said cylinder means formed by the end portions of the housing of said pressure plate structure, said cylinder and piston means effecting selective shifting of said pressure plate structure in opposite directions for actuation of either one of said friction disk assemblies when pressure fluid is selectively fed into said cylinders.

2. In a dual clutch mechanism, the combination of two clutch devices jointly including a single, axially non-shiftable, elongated chambered backing plate structure, a single, axially non-rotatable, shiftable, chambered pressure plate structure arranged within the chamber of said elongated backing plate structure axially thereof, and a friction disk assembly for each of said clutch devices, said friction disk assemblies arranged in laterally spaced relation in the chamber of said pressure plate structure, said pressure plate structure including end walls forming pressure plate members, and said backing plate structure including backing plate means arranged in the central portion thereof and extended into the pressure plate structure substantially midway between its laterally spaced pressure plates, to arrange the backing plate means between and adjacent to the friction disk assemblies.

3. A dual clutch mechanism as described in claim 2, wherein spring means are arranged between the pressure plate members and the elongated backing plate structure to yieldingly hold the pressure plate structures in predetermined position in said backing plate structure.

4. In a dual clutch mechanism, the combination of two clutch devices jointly embodying a single, axially non-shiftable backing plate structure, including a substantially cylindrical housing having cylinder-like portions at its opposite closed ends, and a single, shiftable pressure plate structure supported by and axially shiftably arranged within the housing of said backing plate structure, and a friction disk assembly for each of said clutch devices arranged in said pressure plate structure in laterally spaced relation with respect to each other, said pressure plate structure having at its opposite ends pressure plate means enclosed and fluid-tightly guided in the cylinder-like portions of the housing of said backing plate structure, and said backing plate structure including backing plate members extending into said pressure plate means between said friction disk assemblies, and fluid passage means in said backing plate structure in open communication with the cylinder-like portions thereof for selectively shifting said pressure plate structure by pressure fluid selectively fed into said cylinder-like portions of said backing plate structure.

5. In a dual clutch mechanism, two clutch devices jointly including a single, axially non-shiftable backing plate structure embodying a cylindrical housing closed at its opposite ends by ring-shaped, flanged end walls and mounting backing plate means in the housing midway thereof, a single shiftable pressure plate structure within said housing embodying end walls forming pressure plate means arranged at opposite sides of the backing plate means of said backing plate structure, said pressure plate means spaced from the end walls of said housing and fluid-tightly sealed to the peripheral wall thereof to provide at the end portions of said housing cylinder-piston means adapted to effect shifting of the pressure plate structure by fluid under pressure selectively fed into said cylinder-piston means, and coil spring means in the said cylinder-piston means, yieldingly holding the pressure plate structure in a predetermined position to automatically inactivate the clutch devices.

6. In a dual clutch mechanism, the combination of two clutch devices jointly including a single, chambered pressure plate structure having end walls forming pressure plate means, a single backing plate structure encircling said pressure plate structure and shiftably mounting same, said backing plate structure provided with end walls and backing plate means extended between said end walls into the pressure plate structure, two individual friction disk assemblies in said pressure plate structure arranged between the pressure plate means which form the end walls thereof and the said backing plate means, and oppositely arranged cylinder piston means formed by the end walls of said backing plate structure and the pressure plate means of the pressure plate structure for selectively shifting said pressure plate structure and actuating either one of the friction disk assemblies.

7. In a dual clutch mechanism two clutch devices jointly including a single axially non-shiftable backing plate structure having backing plate means arranged midway therein, a single chambered pressure plate structure having end walls forming axially spaced pressure plate means, said pressure plate structure arranged slidably and non-rotatably within said backing plate structure and the end walls of said pressure plate structure being arranged at opposite sides of the backing plate means of the backing plate structure, and two individual, laterally spaced, friction disk assemblies extended into said pressure plate structure between the backing plate means and the pressure plate means, the backing plate structure having a housing fluid tightly encircling the end walls of the pressure plate structure and forming therewith cylinder piston members arranged at the opposite ends of the backing plate structure and adapted to effect selective shifting of said pressure plate structure for selective actuation of the friction disk assemblies of said clutch device.

8. In a dual clutch mechanism the combination of two clutch devices jointly including a single, elongated, chambered pressure plate structure having end walls forming pressure plate means, a single backing plate structure embodying a cylindrical housing shiftably and axially non-rotatably mounting therein said pressure plate structure, backing plate means within said housing midway between its ends extended into the pressure plate structure between the end walls thereof, two individual friction disk assemblies in said pressure plate structure arranged between said pressure plate means, spring means in said cylindrical housing seated between the end walls thereof and the end walls of the pressure plate structure and adapted to yieldingly position same in said housing in a predetermined position, and sealing means fluid-tightly sealing the end walls of the chambered pressure plate structure to the cylindrical wall of the housing of said backing plate structure and providing cylinder piston means at its opposite end portions adapted to selectively actuate said friction disk assemblies by selectively shifting the pressure plate structure in opposite directions when fluid under pressure is selectively fed into the said cylinder piston means.

CHRIS GERST.

REFERENCES CITED

The following references are of record in the file of this patent:

UNITED STATES PATENTS

| Number | Name | Date |
|---|---|---|
| 661,070 | Olds | Nov. 6, 1900 |
| 918,652 | Bryan | Apr. 20, 1909 |
| 2,234,693 | Frink | Mar. 11, 1941 |
| 2,399,853 | Chilton | May 7, 1946 |
| 2,437,430 | Lawrence | Mar. 9, 1948 |
| 2,464,538 | Vanderzee | Mar. 15, 1949 |
| 2,492,477 | Hanley et al. | Dec. 27, 1949 |

FOREIGN PATENTS

| Number | Country | Date |
|---|---|---|
| 465,612 | Great Britain | May 10, 1937 |
| 41,842 | Netherlands | Oct. 15, 1937 |